(12) United States Patent
Ekwiński (10) Patent No.: US 11,258,342 B2
(45) Date of Patent: Feb. 22, 2022

(54) ELECTRICAL MACHINE

(71) Applicant: Equelo sp. z o. o., Warsaw (PL)

(72) Inventor: Grzegorz Ekwiński, Piaseczno (PL)

(73) Assignee: Equelo sp. z o. o., Warsaw (PL)

( * ) Notice: Subject to any disclaimer, the term of this patent is extended or adjusted under 35 U.S.C. 154(b) by 115 days.

(21) Appl. No.: 16/634,494

(22) PCT Filed: Dec. 14, 2017

(86) PCT No.: PCT/PL2017/000125
§ 371 (c)(1),
(2) Date: Jan. 27, 2020

(87) PCT Pub. No.: WO2019/022624
PCT Pub. Date: Jan. 31, 2019

(65) Prior Publication Data
US 2020/0259405 A1 Aug. 13, 2020

(30) Foreign Application Priority Data

Jul. 28, 2017 (PL) .......................................... 422393

(51) Int. Cl.
*H02K 21/24* (2006.01)
*H02K 11/215* (2016.01)
(Continued)

(52) U.S. Cl.
CPC ........... *H02K 21/24* (2013.01); *H02K 1/2793* (2013.01); *H02K 1/32* (2013.01); *H02K 5/15* (2013.01);
(Continued)

(58) Field of Classification Search
CPC ............. H02K 21/24; H02K 1/20; H02K 9/06
(Continued)

(56) References Cited

U.S. PATENT DOCUMENTS 4,358,693 A * 11/1982 Palmer .................. H02K 25/00
310/112
5,021,698 A * 6/1991 Pullen .................. H02K 1/2793
310/112
(Continued)

FOREIGN PATENT DOCUMENTS

| CA | 2368426 A1 | 7/2003 |
| GB | 2466436 A | 6/2010 |

(Continued)

OTHER PUBLICATIONS

International Search Report, Application No. PCT/PL2017/000125, dated Apr. 6, 2018, 3 pages.

*Primary Examiner* — Jose A Gonzalez Quinones
(74) *Attorney, Agent, or Firm* — Ziegler IP Law Group, LLC (57) ABSTRACT

An electrical machine includes a stator containing bearing plates and windings conducting electrical current and the rotor. The stator has windings conducting electric current embedded in a composite material and shaped into winding segments forming a ring segment of an angular span constituting a part of the full angle. The segments are inserted between the external and internal discs of the rotor. The magnetic poles are embedded and magnetised towards the axial direction of internal discs. The poles are separated from each other with a spacing made of a non-magnetic composite material of the internal and external discs structure. Each external and internal disc has an external reinforcing ring, made of a non-magnetic composite material reinforced with fibres of strength exceeding 1 GPa, formed by winding the fibres together with resin on the cylindrical surface of the discs. The external discs have a ring closing the magnetic circuit.

13 Claims, 8 Drawing Sheets

(51) Int. Cl.
*H02K 11/22* (2016.01)
*H02K 1/27* (2006.01)
*H02K 1/32* (2006.01)
*H02K 5/15* (2006.01)
*H02K 5/20* (2006.01)
*H02K 9/10* (2006.01)
*H02K 1/2793* (2022.01)

(52) U.S. Cl.
CPC ................ *H02K 5/20* (2013.01); *H02K 9/10* (2013.01); *H02K 11/215* (2016.01); *H02K 11/22* (2016.01)

(58) Field of Classification Search
USPC ............................ 310/52, 60 R, 266–268, 61
See application file for complete search history.

(56) References Cited

U.S. PATENT DOCUMENTS

| | | | | |
|---|---|---|---|---|
| 5,619,087 | A * | 4/1997 | Sakai | H02K 1/12 310/156.36 |
| 5,892,307 | A * | 4/1999 | Pavlovich | H02K 1/32 310/68 B |
| 5,982,074 | A * | 11/1999 | Smith | H02K 3/28 310/254.1 |
| 6,163,097 | A | 12/2000 | Smith et al. | |
| 2009/0072639 | A1* | 3/2009 | Seneff | H02K 1/2793 310/43 |
| 2010/0253173 | A1* | 10/2010 | Miyata | H02K 3/47 310/208 |
| 2016/0344249 | A1* | 11/2016 | Enjoji | H02K 9/22 |

FOREIGN PATENT DOCUMENTS

| | | |
|---|---|---|
| JP | H08266021 A | 10/1996 |
| JP | 2003510993 A | 3/2003 |
| JP | WO2008117631 A1 | 7/2010 |
| WO | 2015111579 A1 | 7/2015 |

* cited by examiner

ELECTRICAL MACHINE

FIELD

The aspects of the disclosed embodiment is the electrical machine which can operate either in the motor mode: converting electrical energy into rotational mechanical energy or in the generator mode: converting rotational mechanical energy into electrical energy Since the creation of the first electric motors, constructors have been trying to create ever new structures designed to eliminate or reduce the deficiencies of the previous solutions. We can identify a number of motor features, i.e. general features similar for all drives, such as engine performance that can be defined for each drive which usually ranges from 50% to 95%, and special features which in some cases differ by several orders of magnitude, such as power, revolutions per minute, weight or production cost. In recent times, it becomes more and more important not only to use electricity to assist us in all our activities but also the method it is used, i.e. we naturally prefer to clean the floor with a vacuum cleaner rather than with a brush and for some time it has become important that the vacuum cleaner is equipped with a highly efficient motor with low power but high suction capacity. This is mainly because we have appreciated drive parameters which were once considered insignificant and sometimes even negligible. These features include e.g. energy efficiency, work culture (e.g. low noise operation, reduced electromagnetic interference) and recyclability. The object subject to this patent is the electric motor displaying extremely high performance in converting electrical energy into mechanical energy. This motor can also operate as a power generator. Electrical drive with extremely high efficiency has many very favourable characteristics which are now beginning to be observable, yet not too apparent, such as:

A: Energy efficiency. High efficiency of 99% means a very small energy loss of 1%. A motor of mechanical power of 1000 W consumes from 1010 W-1015 W of electrical power instead of 1100 W or 1300 W as it is currently the case. Mass utilization of such motors will result in large savings in electricity.

B: Financial savings. In the case of the industrial use of the motor drive, energy efficiency brings large financial savings to the owner resulting from the small loss of energy supplied to the device.

C: Compact size. Small energy losses inside the motor drive mean lower thermal radiation, and consequently it is possible to construct relatively small drives with power comparable to presently much larger devices as such motor drives do not overheat during due to the internal heat emission.

D: High dynamics. High-power and compact-size drives are characterised by exceptional high dynamics as the small size results in reduced moments of inertia and a relatively high power generates high torque. This means that it is possible to achieve large accelerations which is highly preferable in applications such as e.g. robotics.

E: Low price. Compact, light weight motors—compared to the solutions existing on the market—require the less raw materials and are less problematic in production. It is easier to carry out assembly operations with a motor weighing 12 kg instead of 80 kg. All this translates into a lower cost of production of the drive.

Currently, various electric motors are used, and the main criterion in the selection of the motor is the type and nature of the work. A different drive will be used in the air conditioning fan and a different one to maneuver the position of a robot arm. After all, the final criterion of the drive selection is always the economics, i.e. cost of purchasing, installing and operating of the drive. In all types of electric drives and in most applications, one can notice more designs with enhanced performance and their more frequent utilization. The trend will continue until we discover the electrical drive operating with no loss.

In the present state of technical advancement, we can observe the following sources of energy loss in motor drives:

A. Losses in the form of heat emission in the motor coil windings. These losses arise from the flow of electricity in a conductor of non-zero resistance. The power loss generated by the resistance of the coil winding is numerically equal to the product of the amount of the electric current to the second power and the resistance of coil windings $P_{strat}=R*I^2$ ($P_{strat}$ [W], R [Ohm], I [A]). One can significantly reduce these losses by reducing the current density in the windings and reducing the resistance of the windings. The reduction of current density decreases the torque generated by the motor, so that to obtain useful motor power one should increase motor rotational speed as the mechanical power of the motor is equal to the rotational speed multiplied by the value of the drive torque $P_{mech}=\Box*M_{nap}$ ($P_{mech}$ [W], $\Box$ [Rad/s], $M_{nap}$ [Nm]). The reduction of windings resistance can be obtained by changing the material from which they are made—which is completely uneconomical as silver's resistance is insignificantly lower than copper which is much more expensive.—or by increasing the cross-section of the windings (thickening) and reducing the length of the windings. The increase of motor rotational speed can be achieved by increasing the voltage applied to the windings. In classically designed motors, such changes will result in a large increase in inrush current and motor speed. At the start-up, such a motor may be damaged due to the burning-out of the winding since the value of the current circulating in the windings is a factor of the resistance of the winding and the voltage applied thereto. Having started the motor, as the motor speed increases, the electric current in the winding decreases due to inductance of the winding and the generation of reverse voltage in the winding as a result of alternating magnetic field generated in the coils. The negative effects of reducing motor windings resistance can be diminished using the external electronic systems to control the current. These solutions are applied in servo drives where the servo drive controller permanently tests the electricity circulating in the windings so that it does not exceed the value safe for the motor. It can be noticed that these drives are highly efficient, compact, with relatively high power output and high dynamics. We owe this mainly to the development of MOSFET transistors, the reduction of their resistance in conduction and the reduction of the shift time which allows to create highly efficient drive power systems.

B. Losses in the cores of magnetic circuits of coils. In the vast majority of motors, the windings cooperate with the cores or core of the motor magnetic circuit which consists of a batch of silicon sheets or other material. This plays two major roles: (1) it mechanically determines the windings location and directs the flow of the magnetic field in an appropriate manner. Unfortunately, the variable magnetic field generated by the winding constantly re-magnetises the core and this results in power loss. The core temperature rises simply due to the continuous relocation of the magnetic domains. You can eliminate this type of power loss by eliminating the magnetic core. Such motors have been known for a number of years and are called coreless or ironless DC motors. They are produced by MaxonMotor (line: Maxon RE motors), Faulhaber or Portescap (Brush DC Coreless Motor 28DT12). This type of drive is applied not only in classic motors: an arm in hard disk drives (HDD) also has a coreless drive. A frame built of a winding coil embedded in epoxy resin moves in the magnetic field generated by a pair of neodymium magnets. Today, this is a widespread solution among the producers of such devises. This design is characterised by both high dynamics and efficiency.

Another example of coreless (ironless) DC drive may be the drive of a diaphragm in a loudspeaker. In the magnetic field generated by a ring magnet, there is a very lightweight coil glued to the speaker diaphragm moving. As shown before, one can observe a very high dynamics of the drive.

C. Losses in mechanical commutators. Mechanical commutation, so-called switch based, is based on supplying the current using brushes, made mostly of graphite and copper, to these elements of the commutator, which is located on the rotor of the machine, to which individual coils of the rotor winding are connected. Due to the resistance at the brush-commutator connection, we observe losses of electrical energy, as well as sparking resulting from the mechanical engagement and disengagement of the electrical circuits. One can eliminate these losses by applying another motor design, i.e. by placing the winding in the stator and the magnets on the motor rotor and changing the currents in the winding coils using an electronic commutator. This type of switching is called contactless switching and apart form eliminating the problematic element from the inside of the motor it improves reliability of the entire drive.

D. Losses arising from the need to generate electrically the magnetic excitation circuit. Some motor designs, e.g. single-phase universal AC motors, are fitted with winding coils which generate excitation magnetic flux which reacts with the magnetic field generated by the coils on the motor rotor. This solution is today widely applied in the household equipment, food processors, vacuum cleaners etc. Alternating current powering the motor is supplied to the rotor by means of the brushes and the commutator. This forces alternating magnetic field to be also generated in the stator. Therefore permanent magnets are not used as the sources of magnetic field excitation in the stator but instead electromagnet winding coils supplied from the same source as the motor rotor. Although this is a widespread solution, it makes motors of this type inefficient. This problem can be eliminated by changing the motor design, the use of permanent magnets e.g. neodymium magnets to generate excitation magnetic flux and an electronic commutator. Owing to this concept, the losses generated in the motor windings arise only in the windings interacting with the excitation field, and no loss arises in the generation of the excitation field as it is created by permanent magnets.

U.S. Pat. No. 6,163,097 discloses a similar design. However, attention should be given to the following problems:

A. In the patent disclosure, the discs contain permanent magnets in the form of monolithic ring magnets alternately multi-pole magnetised which results in a technological problem and reduces the selectivity, or even disturbs the distribution of the magnetic field between the individual magnetic poles in the subsequent rotor discs.

B. In the disclosure, the discs contain permanent magnets as monolithic ring magnets alternately multi-pole magnetised which lowers the durability of the discs against breaking during the rotation movement. The author provide no structural reinforcement of the disc e.g. by application of an external ring made of e.g. glass fibre which would contribute to increase of the maximum speed of the rotor.

C. The disclosure presents packages of winding in the form of ring systems made of copper sheets, rods or profiles of very low resistance. The system is very inconvenient during installation of the device. It requires the rotor disk and stator winding rings to be installed in sequence. Moreover, a very low resistance of the stator windings and many magnetic poles on the rotor discs necessitate high frequency of changes of the windings power supply. The skin effect which occurs in the windings applied by the author will reduce the efficiency of the system and lead to the lowering of power. It is applicable, in this type of devices, to use windings made of multicore conductors, the so-called: stranded copper. Many cores, e.g. 200, with the very small diameter of below 0.4 mm eliminate the skin effect causing even flow of current in the whole cross-section of the windings.

Document U.S. Pat. No. 5,021,698 discloses a machine comprising a plurality of axial field rotor stages each comprising a plurality of magnet segments arranged around a driven hub in a pre-stressed assembly in which encompassing hoop means exerts sufficient compressive stress on the magnets and hub assembly to counter centripetal forces generated by speeds of up to 100,000 rpm. Alternative methods of stressing the hoop means is described.

Description U.S. Pat. No. 5,619,087 discloses a design which contains most of the above solutions. However, attention should be given to the following problems:

A. In the disclosure, the discs contain alternating magnetic poles of permanent magnets where each such pole is made up of many magnets with a relatively small size among which there is no contact and the magnets by design have different induction of the magnetic field. This is to reduce vibration during the operation and improve durability at the increased rotational speed. This reduces the active cross-section of the magnetic pole. A motor of this type can generate a limited drive torque which limits its usefulness.

B. In the disclosure, the discs contain, in alternating fashion, magnetic poles made of permanent magnets, and the lines of the magnetic pole force are locked within the static rings made of a magnetically soft metal sheet fixed in the front plates (bearing) of motor. This is unfavourable as the continuous over-magnetizing of the rings material closing the magnetic circuit reduces the efficiency of the entire system.

SUMMARY

The invention claimed herein is to design the electrical machine with minimum energy loss during operation.

The electrical machine consists of the stator containing winding bearing plates conducting electrical current, a rotor, and external discs and internal discs of the rotor, in which magnetic poles are embedded and magnetised towards the axial direction of the internal discs, consisting of at least one permanent magnet, wherein a segments are inserted between external discs and internal discs of the rotor. The stator contains the winding conducting electrical current embedded in non-magnetic composite reinforced with the fibres with tensile strength of over 1 GPa, and shaped in the form of flat segments constituting a section of the ring of the angular span being the part of the full angle where the total multiplicity of this section results in a full angle, i.e. 180 degrees, 120 degrees, 90 degrees etc. The electrical machine is characterized in that the external discs and the internal discs are made of non-magnetic composite reinforced by fibres of tensile strength exceeding 1 GPa, and with the poles separated by a spacing made of non-magnetic composite material of the disc structure. In addition, each external and internal disc has an external reinforcing ring on the circumference made of a non-magnetic composite material reinforced with fibres of tensile strength exceeding 1 GPa; the ring is made by winding fibre and resin on the cylindrical surface of the disc. The ring mechanically reinforces the discs so that they are not ruptured as a result of the action of the centrifugal force. The external rotor discs (the first and last disc) differ from the internal discs as they additionally have a ring made of ferromagnetic material closing the magnetic circuit. The magnetic poles may, but do not have to, have cuboid shape, i.e. a rectangle shape in the plane of the disc. The poles can also have the shape of a trapezoid wherein the shorter base of the trapezium is located on the side of disc axis or the shape of a ring section. It is important that the poles occupy a relatively large surface of the disc while ensuring the appropriate thickness of bridges between the poles which has a major impact on the strength of the disc at high motor speeds as bridges connect the inner part of the disc with the outer ring thus reinforcing the disc.

Preferably, the machine contains a sensor measuring the shaft rotation angle consisting of an angular position sensor coding disc permanently fixed on the shaft of the machine, rotating together with the discs of the machine and photosensitive elements or magnetic pole sensors cooperating with the sensor coding disc, attached to the stator of the motor.

In addition, a preferably non-magnetic composite reinforced with fibres of tensile strength exceeding 1 GPa is the composite based on epoxy resins.

Preferably, the shaft rotation angle measurement sensor exhibits a higher resolution than the number of magnetic poles on a single disc.

Preferably, the rotor discs have holes letting cooling air and made perpendicularly to the discs surface between the area with magnetic poles and rotor shaft as well as the holes supplying cooling air to the windings that allow air to pass from the mentioned holes to the space between the discs, where the motor winding segments are located, cooling them during operation.

Preferably, the winding segments are combined into winding packets filling the spaces between the multiple discs.

Preferably, the housing has two connectors in the rear bearing plate for pneumatic hoses through which the air cooling the internal parts of the machine is supplied and extracted.

BRIEF DESCRIPTION OF THE DRAWING

The subject of the disclosed embodiments are presented on the figure, where.

BRIEF DESCRIPTION OF THE DISCLOSED EMBODIMENTS

Embodiment 1

An electrical machine of the external diameter of 228 mm and length of 246 mm consisting of the stator with a side cover 3, front bearing plate 1 with the seated front bearing 4 of the motor shaft 7, the rear bearing plate 2 with the seated rear bearing 5 of the motor shaft 7 and the winding conducting electric current embedded in glass-epoxy composite and shaped into the winding segments 20, 4 mm thick, constituting a ring section of 120 degrees. Three phases of winding are within the segments and embedded in epoxy composite 24: phase A 21, phase B 22 and phase C 23 made of multicore stranded copper of 60×0.1 mm. Forty five segments of the winding 20 are divided into three winding segment packets 6 with fifteen segments for each packet within the winding segment packet frame 19. These packets are inserted between the rotor discs. The rotor consists of the motor shaft 7, two external discs 8 and fourteen internal discs 9 made of glass-epoxy composite, thickness: 6 mm, constituting the body of the internal disc 16 and body of the external disc 18, in which twenty four magnetic poles 15 are embedded, magnetised towards the axial direction of the internal discs 9, and consisting of one cuboid neodymium magnet of dimensions: 30 mm×10 mm×6 mm each, magnetised along the dimension of 6 mm, magnetic material N42. The external discs 8, external diameter 183 mm, and internal discs 9 reinforced with the reinforcing external rings 13 and 17 respectively, made of the glass-epoxy composite formed by winding glass fibres together with resit around the cylindrical surface of the discs, whereas the external discs 8 (the first and last disc) of the rotor also have the ring closing up the magnetic circuit 14, made of magnetically soft steel. All rotor discs with magnetic poles are dimensionally protected against the rotation in relation to the motor shaft 7 and are axially maintained within their position by the bearing surface on the motor shaft 7 from one side and on the other side by the nut 11 fixing the rotor discs. Both the external discs 8 and internal discs 9 have in their structure holes 25, diameter: 10 mm, providing cooling air during operation to gaps 26 supplying cooling air to the windings which, as a result of centrifugal force, is forced into the space around the winding section 20. The motor shaft rotation angle measurement sensor 7 consists of the coding disc 12 permanently fixed on the machine shaft, and the photosensitive sensors 10 cooperating with the sensor coding disc 12, permanently fixed to the motor stator with resolution 360 pulses per one rotation of the motor shaft 7.

The machine supplied from an external controller, operating in the motor mode, generated mechanical power of 101.72 kW when supplied under voltage equal to 400 V. The current was 256 A and at rotational speed: 21 080 rpm, the torque reached 46.08 Nm. Efficiency of the machine in this mode was 99.34%±0.05%.

In the generator mode, the machine with very similar rotational speed and driving torque at 100 kW power, attained the efficiency of conversion of mechanical energy into electrical energy equal to 99.42%±0.05%. The results obtained by the prototype confirm the advisability of the application of the aforementioned solutions. insignificant losses, at the level of 0.6%, allowed to construct an electrical machine generating high power and remaining small dimensions, which was the initial goal.

Embodiment 2

Figure 8:
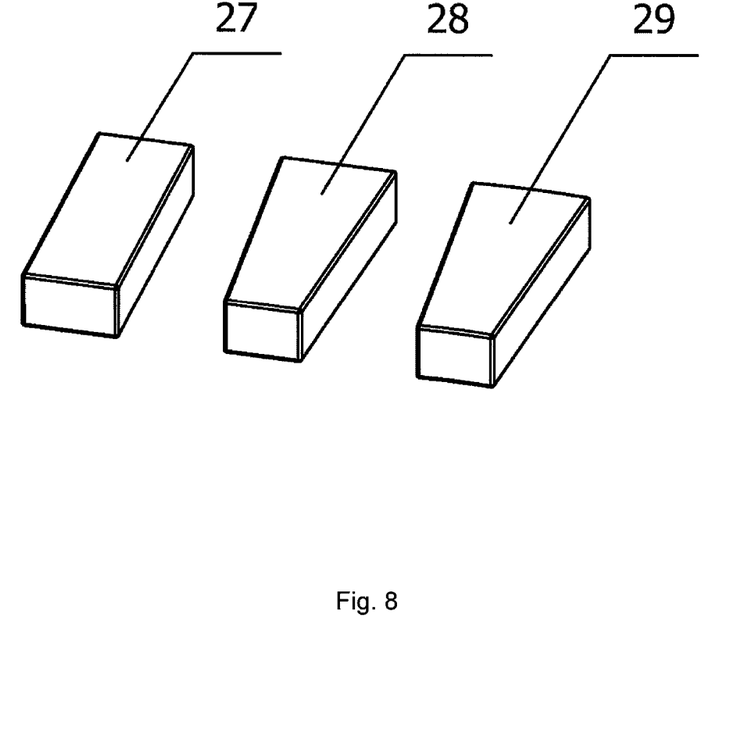

The electrical machine mentioned in Embodiment 1 was made using magnetic poles 15 in the form of singular neodymium magnets of the trapezoid shape 28, wherein shorter base of the trapezoid is positioned at the disc axis side. The dimensions of each magnet 28 were: longer base of the trapezoid: 12 mm, shorter base of the trapezoid: 8 mm, height of the trapezoid: 39 mm, thickness of pole: 6 mm. Following these dimensions the pole was magnetised, magnetic material N42. The above described magnetic poles 15 were applied both in the fourteen internal discs 9 as well as in the two external discs 8.

The machine, as previously mentioned, supplied from an external controller, operating in the motor mode, generated mechanical power of 101.85 kW when supplied with voltage equal to 400 V. The current was 256 A and at the rotational speed of 21 020 rpm the obtained torque was 46.27 Nm. The efficiency of the machine in this mode was 99.46%±0.05%.

In the generator mode, the machine with very similar rotational speed and driving torque at 100 kW power, attained the efficiency of converting mechanical energy into electrical energy equal to 99.53%±0.05%. The higher efficiency confirms the positive effect of reshaping the magnetic poles 15 on the machine operation.

Embodiment 3

The electrical machine described in Embodiment 1 was constructed using the magnetic poles 15 of singular neodymium magnets in the shape of a ring section 29 with a smaller radius of the ring positioned at the disc axis side. The dimensions of each magnet 29 were: external radius: 83 mm, internal radius: 53 mm, angular span of the ring: 9°, and thickness of pole: 6 mm. According to this dimension the pole was magnetised, magnetic material N42. The magnetic poles 15 were applied both in the fourteen internal discs 9 as well as in the two external discs 8.

The machine, as previously mentioned, supplied from an external controller, operating in the motor mode, generated 101.91 kW of mechanical power when supplied with voltage equal to 400 V. The current was 256 A and at the rotational speed of 19 930 rpm, and the torque reached 48 Nm. The efficiency of the machine in this mode was 99.52%±0.05%.

In the generator mode, the machine at very similar rotational speeds and driving torque of 100 kW power, attained the efficiency of converting mechanical energy into electrical energy equal to 99.57%±0.05%. As in Embodiment 2, the higher efficiency confirms a positive effect of reshaping the magnetic poles 15 on the machine operation.

Embodiment 4

Figure 1:
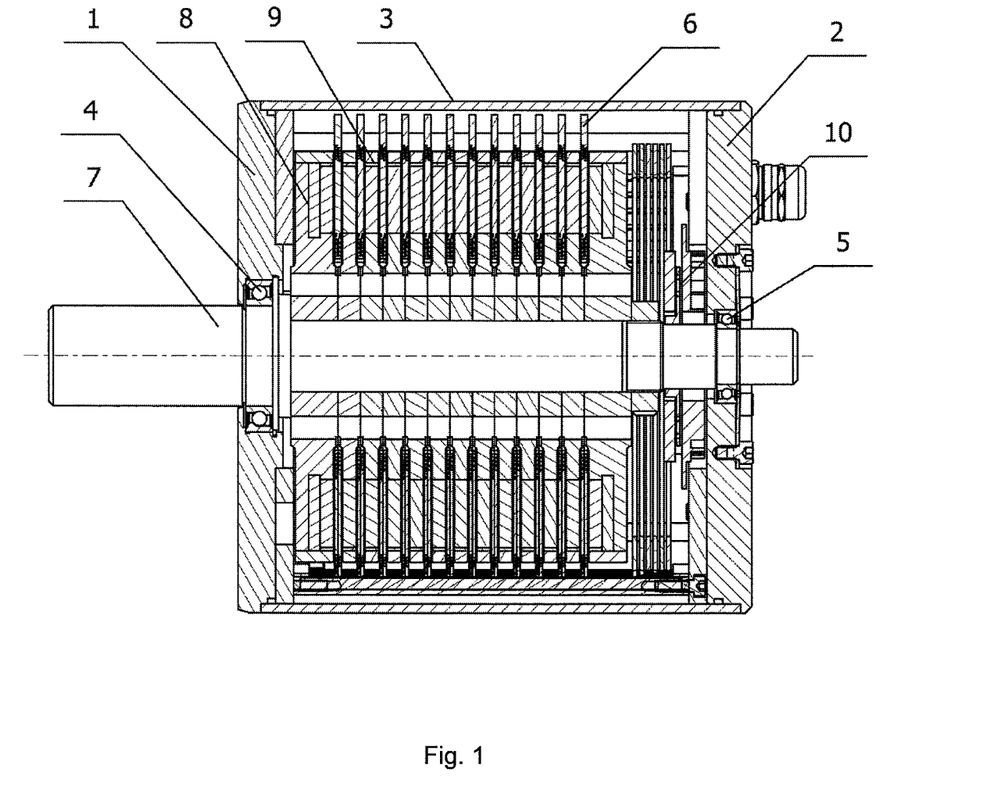
FIG. 1 is a cross-section of the main machine.
Figure 1A:
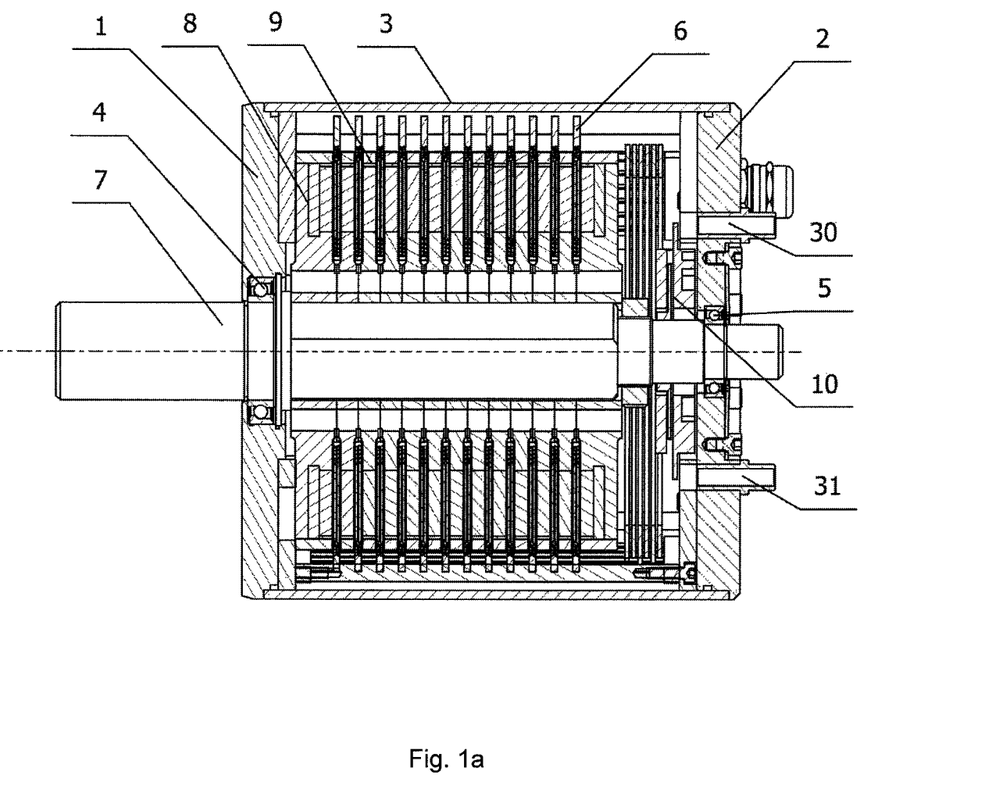
FIG. 1a is a cross section of the main machine with the holes for external air cooling.
Figure 2:
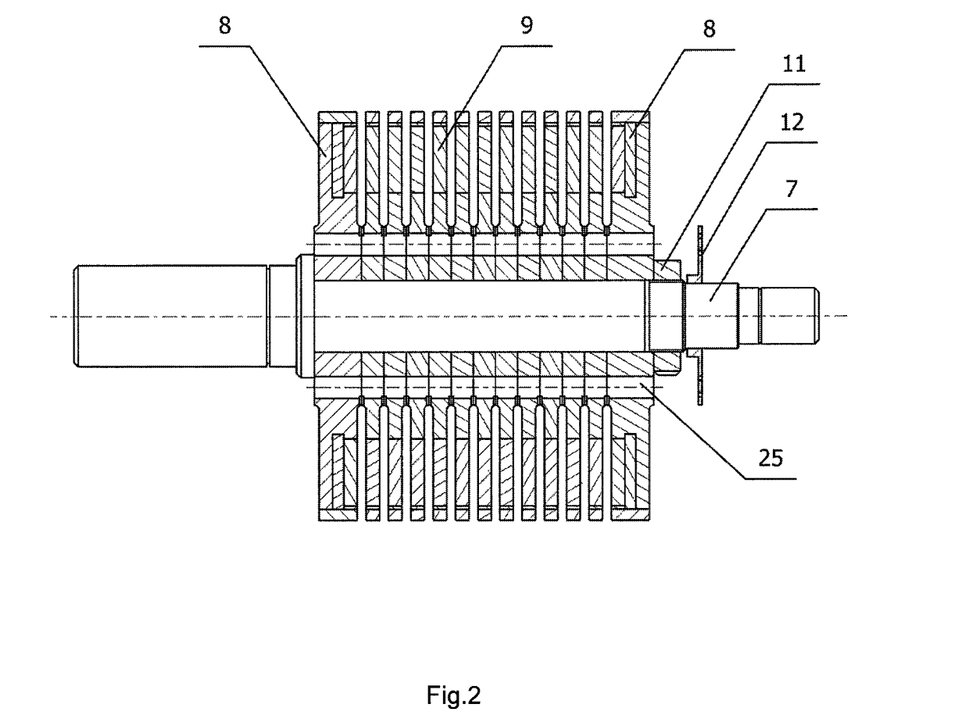
FIG. 2 is a cross-section of the rotor.
Figure 3:
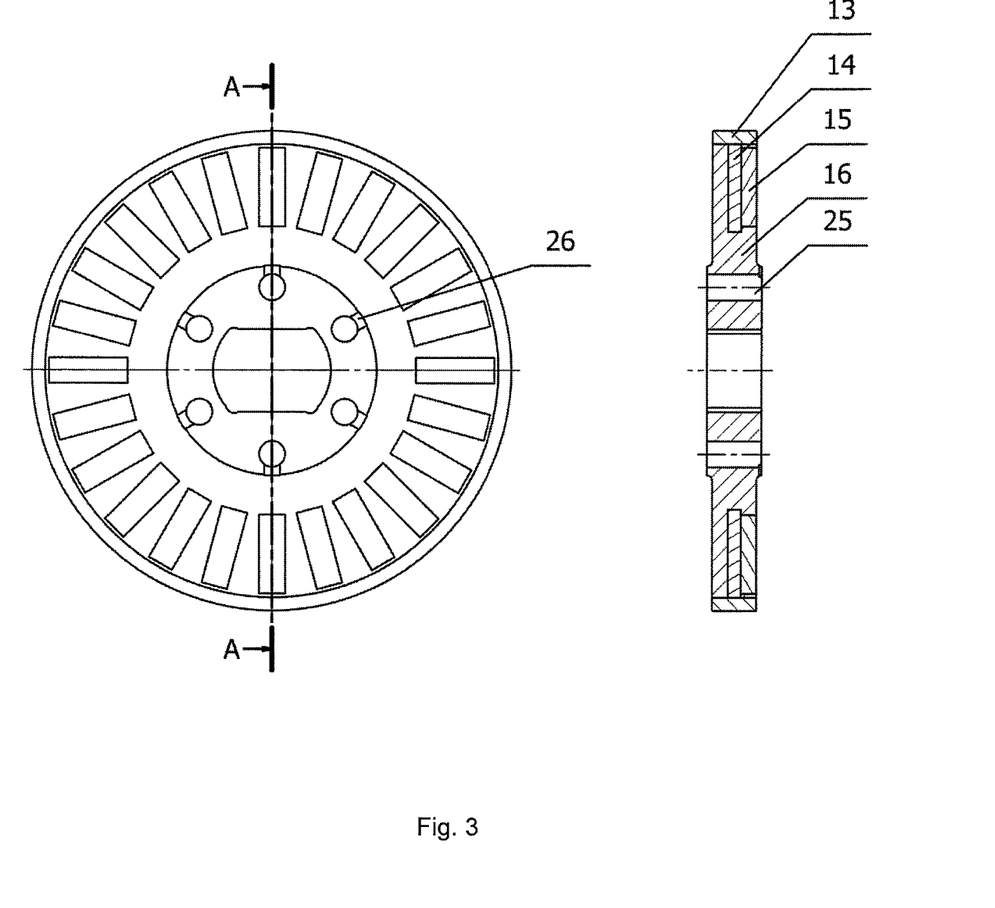
FIG. 3 presents the view of the external disc and its cross-section along the A-A line.
Figure 4:
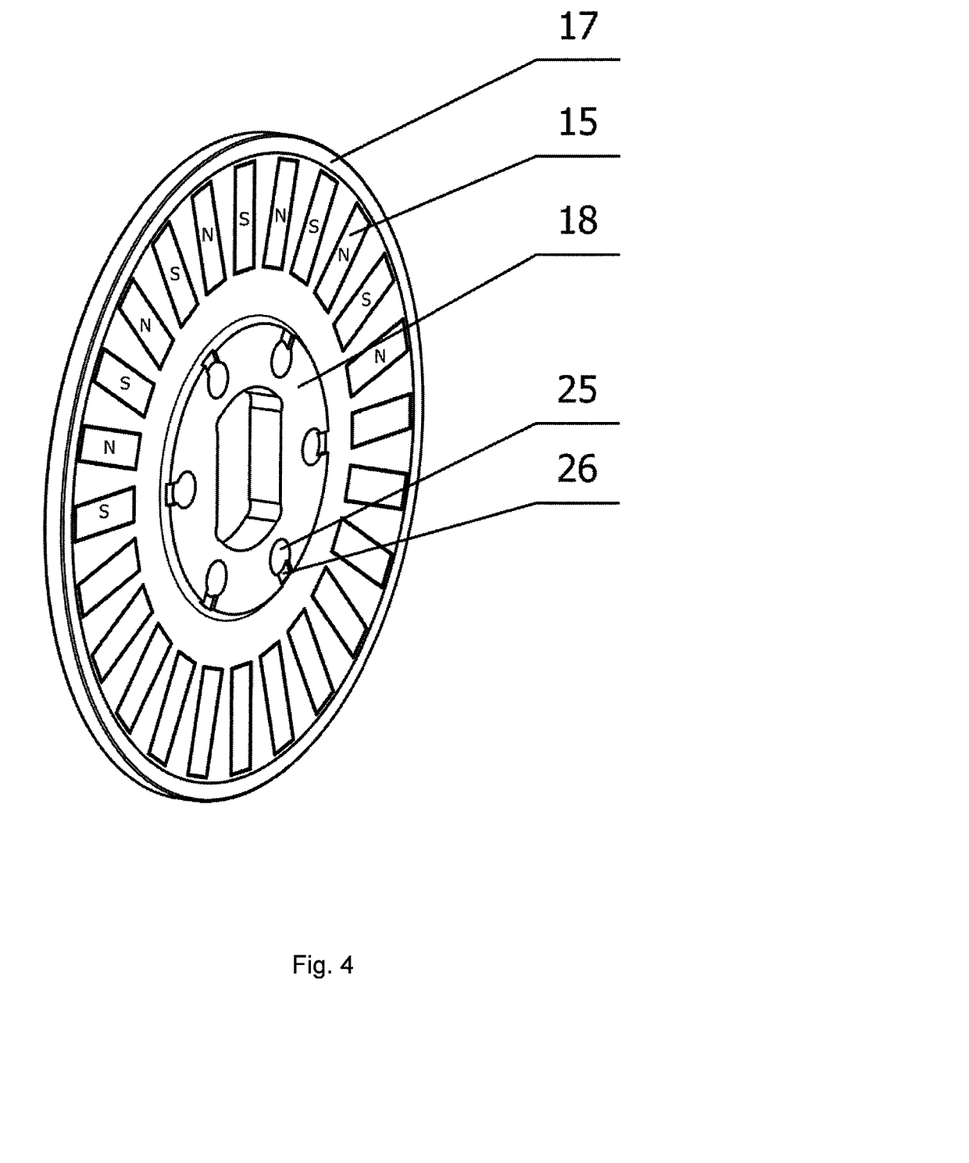
FIG. 4 presents the view of the internal disc, FIG. 5 the view of the packet of winding segments, FIG. 6 the view of the winding segment, FIG. 7 the view of a single winding phase, FIG. 8 the view of various shapes of the magnetic poles made of a single magnet.
Figure 5:
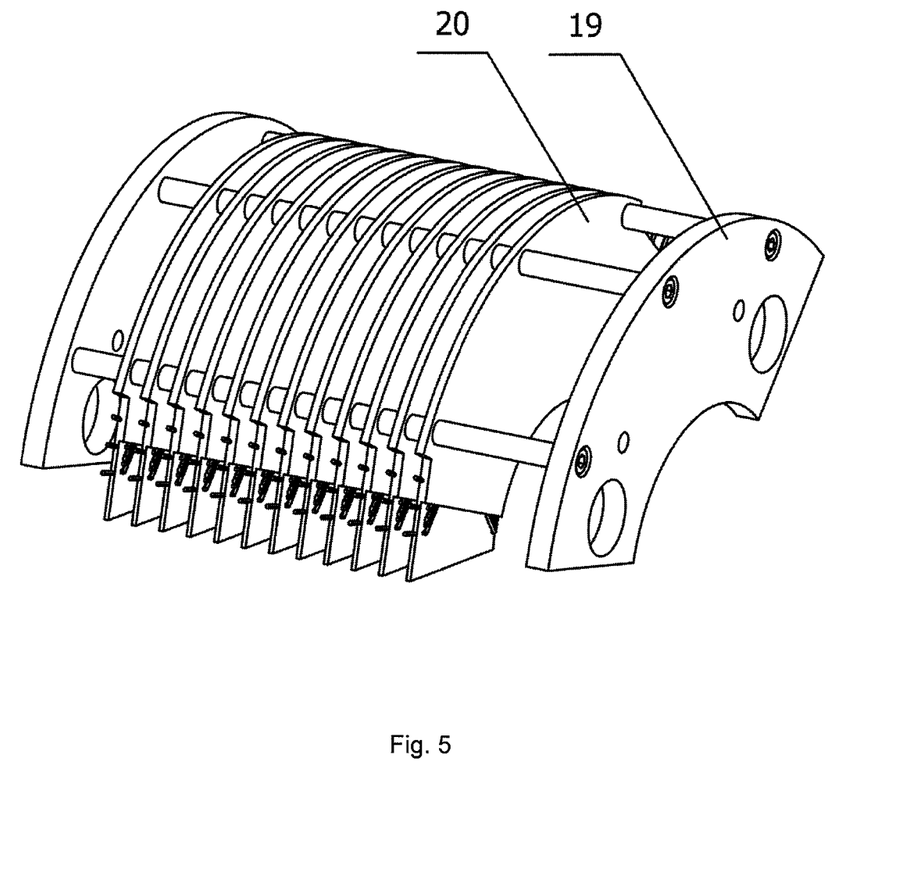
Figure 6:
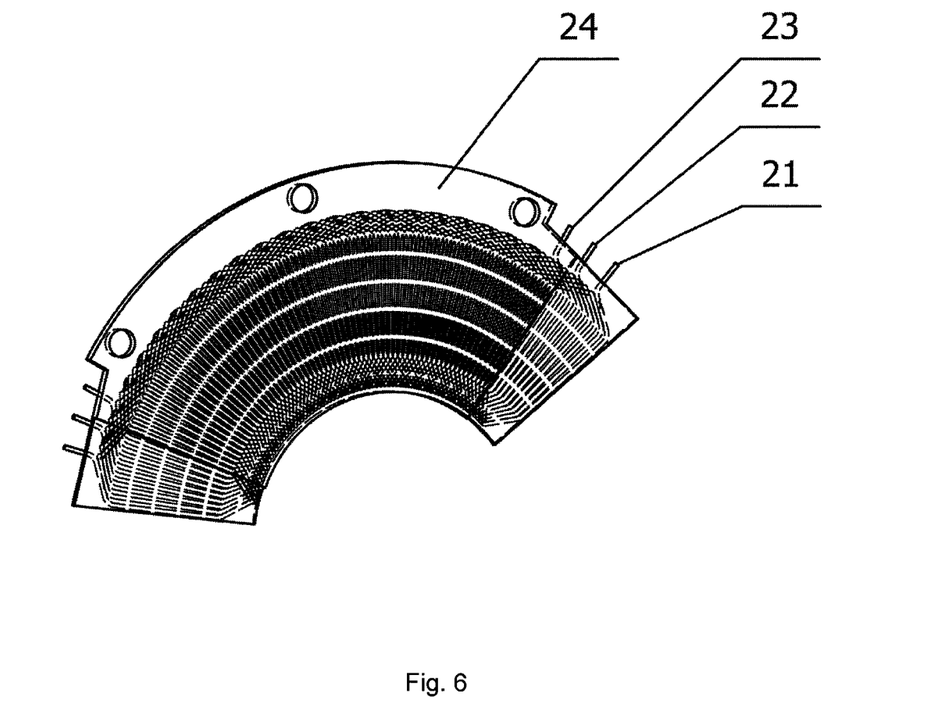
Figure 7:
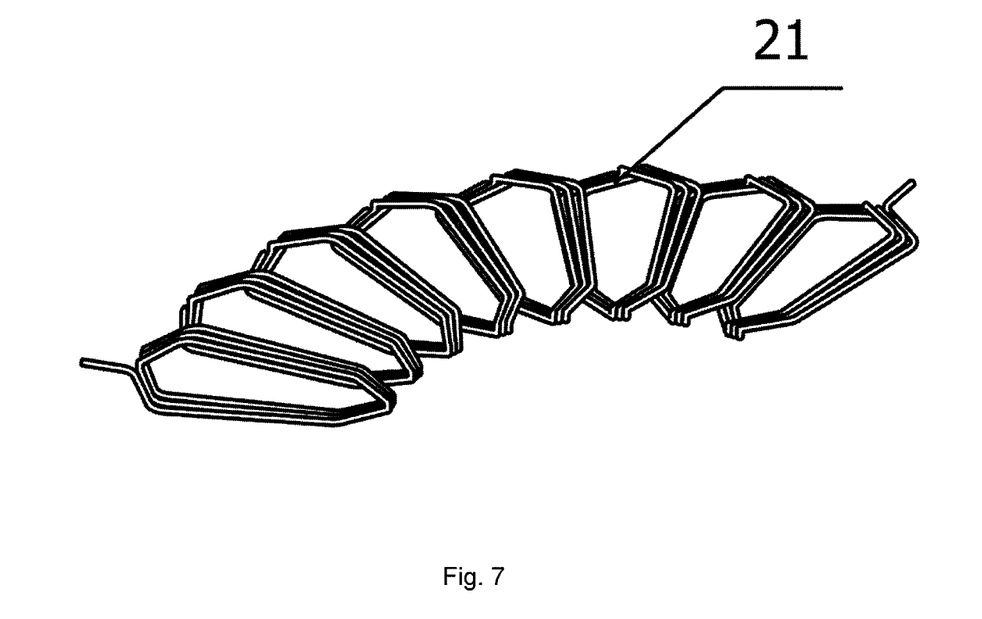

The electrical machine as mentioned in Embodiment 3, was made with the additional holes 30 and 31 in the rear bearing plate 2. When operating at the power of 100 kW, the temperature inside the machine was measured to be 12° C. lower than in Embodiment 3. The temperature of 68° C. dropped to 56° C. when supplied by air at the temperature of 25° C. and the output of 30 litres per minute. The reduced temperature inside the machine allows to increase the mechanical power on the shaft in the future.

What is claimed is:

1. An electrical machine consisting of a stator with bearing plates, windings conducting electric current, a rotor, and external discs and internal discs of the rotor, in which magnetic poles are embedded and magnetised towards an axial direction of the internal discs, consisting of at least one permanent magnet, wherein a segments are inserted between the external discs and the internal discs of the rotor, wherein the stator comprises windings conducting electric current embedded in a composite material and shaped into winding segments forming a section of a ring with an angular span ranging within a full angle, wherein a total multiplicity of this section gives a full angle, i.e. e.g. 180 degrees, 120 degrees, 90 degrees, etc., wherein the external discs and the internal discs are made of non-magnetic composite and reinforced with fibres of strength exceeding 1 GPa, whereas the magnetic poles are separated from each other with a spacing made of a non-magnetic composite material and of a structure of the internal and discs and the external discs, wherein each of the external discs and internal discs has on a circumference an external reinforcing ring and, respectively, made of a non-magnetic composite material reinforced with fibres of strength exceeding 1 GPa, formed by winding the fibres together with resin on a cylindrical surface of the internal discs and the external discs, while a first internal disc and a last internal disc of the external discs of the rotor have a ring closing a magnetic circuit made of ferromagnetic material.

2. The electrical machine according to claim 1, wherein a motor shaft rotation angle measurement sensor configured to measure a motor shaft rotation angle consists of a sensor coding disc permanently fixed onto a motor shaft of the electrical machine, rotating together with the motor shaft and photosensitive elements or magnetic pole sensors cooperating with the sensor coding disc, permanently attached to the stator of the motor shaft.

3. The electrical machine according to claim 2, wherein the motor shaft rotation angle measurement sensor has a higher resolution than a number of magnetic poles on a single disc of the motor shaft.

4. The electrical machine according to claim 1, wherein the non-magnetic composite material reinforced with fibres of tensile strength exceeding 1 GPa is based on epoxy resins.

5. The electrical machine of according to claim 1, wherein the internal discs and external discs of the rotor contain holes made perpendicularly to a surface of the disc, between the area with the magnetic pole and the shaft of the rotor as well as a spacing or hole guiding a cooling air to the windings from the holes.

6. The electrical machine according to claim 1, wherein the segments of the winding are connected into packets of the winding segments, and filling the space between the numerous discs of the rotor.

7. The electrical machine according to claim 1, wherein the windings are made of a stranded wire conductor.

8. The electrical machine according to claim 1, wherein the magnetic poles whose dimension in a radial direction exceeds a dimension in a direction perpendicular to the radial direction in a plane of the disc.

9. The electrical machine according to claim 1, wherein the at least one permanent magnet used to form a magnetic pole of the internal disc contain neodymium.

10. The electrical machine according to claim 1, wherein the magnetic poles have a rectangular shape in a plane of the disc.

11. The electrical machine according to claim 1, wherein the magnetic poles have isosceles trapezoid shape in a plane of the disc, wherein a shorter base of the isosceles trapezoid is oriented towards a disc axis.

12. The electrical machine according to claim 1, wherein the magnetic poles have a shape of a ring segment in a plane of the disc.

13. The electrical machine according to claim 1, wherein two connectors are located in a rear bearing plate for pneumatic hoses through which air cooling of internal parts of the electrical machine is supplied and extracted.

\* \* \* \* \*